(12) United States Patent
Sun et al.

(10) Patent No.: US 11,314,861 B2
(45) Date of Patent: Apr. 26, 2022

(54) PER THREAD SIDE CHANNEL ATTACK PROTECTION

(71) Applicant: INTEL CORPORATION, Santa Clara, CA (US)

(72) Inventors: Ke Sun, Portland, OR (US); Kekai Hu, Portland, OR (US); Henrique de Medeiros Kawakami, Santa Clara, CA (US); Rodrigo Branco, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 335 days.

(21) Appl. No.: 16/584,373

(22) Filed: Sep. 26, 2019

(65) Prior Publication Data

US 2020/0019701 A1 Jan. 16, 2020

(51) Int. Cl.
*G06F 21/55* (2013.01)
*G06F 21/75* (2013.01)
*H01B 1/08* (2006.01)
*H01B 1/22* (2006.01)

(52) U.S. Cl.
CPC .......... *G06F 21/554* (2013.01); *G06F 21/556* (2013.01); *G06F 21/755* (2017.08); *H01B 1/08* (2013.01); *H01B 1/22* (2013.01); *G06F 2221/034* (2013.01)

(58) Field of Classification Search
CPC .... G06F 21/554; G06F 21/556; G06F 21/755; G06F 2221/034; G06F 21/75; H01B 1/08; H01B 1/22
See application file for complete search history.

(56) References Cited

U.S. PATENT DOCUMENTS

| 9,740,863 B2 * | 8/2017 | Sherman | G06F 21/575 |
| 2012/0331309 A1 * | 12/2012 | Scott | G06F 21/755 |
| | | | 713/194 |
| 2016/0357963 A1 * | 12/2016 | Sherman | G06F 21/566 |
| 2019/0042739 A1 * | 2/2019 | Browne | G06F 21/554 |
| 2020/0004552 A1 * | 1/2020 | Liu | G06F 9/30134 |

* cited by examiner

Primary Examiner — Baotran N To
(74) Attorney, Agent, or Firm — Alliance IP, LLC (57) ABSTRACT

The present disclosure is directed to systems and methods of selectively implementing SCA mitigation elements on a per-thread basis to mitigate the effects of side channel attacks. Processor core circuits initiate a plurality of processor threads. Each of a plurality of SCA mitigation features include one or more SCA mitigation elements. SCA mitigation control circuitry associates a register circuit with each respective one of the plurality of processor threads initiated by the processor core circuits. The SCA mitigation control circuitry selectively ENABLES/DISABLES one or more SCA mitigation elements for each of the plurality of processor threads. The ENABLEMENT/DISABLEMENT of each of the SCA mitigation elements may be autonomously adjusted by the SCA mitigation control circuitry and/or manually adjusted via one or more user inputs provided to the SCA mitigation control circuitry.

28 Claims, 4 Drawing Sheets

PER THREAD SIDE CHANNEL ATTACK PROTECTION

TECHNICAL FIELD

The present disclosure relates to computer security, specifically the detection and mitigation of side-channel attacks.

BACKGROUND

Modern CPU cores rely upon the efficiency gains obtained through speculative execution to avoid pipeline stalls. Such speculative execution presents a vulnerability to side channel attacks in which the attacker monitors the effect of speculatively executed instructions to infer secret data such as passwords, account numbers, cryptographic keys, and the like. A side-channel attack may include any attack based on information gained from the implementation of a computer system, rather than weaknesses in the implemented algorithm itself. Such side-channel attacks may use timing information, power consumption, electromagnetic leaks or even sound as an extra source of information, that is exploited to obtain information and/or data from the system. Typically, side channel attack protection is applied on an "all or nothing" basis wherein all side channel attack protection is applied to every physical or virtual processor thread, causing significant impact on overall system performance or not applied at all, thereby improving system performance and increasing system vulnerability to side channel attacks.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Side-channel attack ("SCA") detection, mitigation, and/or prevention is typically handled through the use of remedial actions such as implementing corrective code and/or making alterations in system hardware that are developed and issued by device manufacturers as SCA vulnerabilities are discovered. Frequently, each patch includes multiple SCA mitigation elements. Each of the SCA mitigation elements included in each of the patches is executed for each physical and/or virtual processor thread. Thus, each physical or virtual processor thread is protected using every available patch. While thorough, such a comprehensive approach not only consumes system resources and reduces system efficiency, but also, at times, needlessly protects physical or virtual processor threads executing non-critical applications and/or non-critical functions in which secret data is not present or exposed.

As used herein, unless otherwise noted, the term "thread" refers to a physical or virtual processor thread capable of implementation in circuitry that includes any number and/or combination of electronic components, optical elements, semiconductor devices, and/or logic elements.

The systems and methods disclosed herein improve system performance through the use of a per-thread branch control register that enables the selective application of individual side-channel attack (SCA) mitigation elements for each physical or virtual processor thread. For example, assume that two SCA mitigation features ("A" and "B") each include three SCA mitigation elements ("$A_1$," "$A_2$," "$A_3$," "$B_1$," "$B_2$," and "$B_3$"). To execute SCA mitigation features "A" and "B" would thus entail execution of six (6) SCA mitigation elements $A_1$-$A_3$ and $B_1$-$B_3$ for every physical or virtual processor thread. Using the systems and methods disclosed herein, selective execution of the SCA mitigation elements is provided on a per-thread basis. Thus, for a physical or virtual processor thread executing a non-critical application it is possible to improve efficiency by disabling all six SCA mitigation elements, for a physical or virtual processor thread executing a more critical application, it is possible to improve security by enabling all six SCA mitigation elements and for a physical or virtual processor thread executing an application having particular vulnerabilities, it is possible to balance efficiency and security by selectively enabling SCA mitigation elements $A_1$ and $B_1$ and selectively disabling SCA mitigation elements $A_2$, $A_3$, $B_2$, and $B_3$.

The systems and methods disclosed herein implement one or more register circuits for each active physical or virtual processor thread. Each of the one or more register circuits associated with a particular physical or virtual processor thread contains and/or stores data to selectively enable or disable each SCA mitigation element in each SCA mitigation feature. Thus, the association between a register circuit and a physical or virtual processor thread permits a granular implementation of not only each SCA mitigation feature, but advantageously, each SCA mitigation element included in each SCA mitigation feature. The enablement/disablement of SCA mitigation elements may be dynamic, for example, different SCA mitigation elements may be autonomously enabled/disabled based on the context (i.e., user-level context or kernel-level context) of a particular physical or virtual processor thread, or SCA mitigation elements may be autonomously adjusted on a context switch that occurs within a physical or virtual processor thread. The enablement/disablement of SCA mitigation elements may be dynamic, for example, different SCA mitigation elements may be autonomously enabled/disabled upon detection and/or identification of a potential side-channel attack. The enablement/disablement of SCA mitigation elements may be manually adjusted by a system user, for example via an application programming interface (API) implemented under an operating system executed by the system processor circuitry. The enablement/disablement of SCA mitigation elements may be fixed, for example upon system start-up or reboot.

A side channel attack (SCA) mitigation control system is provided. The system may include: memory circuitry to store a plurality of SCA mitigation features, each of the plurality of SCA mitigation features including machine-readable instructions to cause the implementation of one or more SCA mitigation elements; a plurality of register circuits, each of the register circuits associated with a respective one of a plurality of physical and/or virtual processor threads implemented by one or more processor core circuits; wherein each of the register circuits includes information to selectively adjust an ENABLE/DISABLE status for each of the one or more SCA mitigation elements included in an SCA mitigation feature associated with a respective physical or virtual processor thread; control circuitry coupled to each of the plurality of register circuits, the control circuitry to receive one or more control input signals; wherein each of the one or more control input signals is associated with a respective one of the plurality physical and/or virtual processor threads; wherein each of the one or more input signals includes information indicative of the ENABLE/DISABLE status for each of the one or more SCA mitigation elements included in the an SCA mitigation feature.

A side channel attack (SCA) mitigation method is provided. The method may include, for each of a plurality of physical and/or virtual processor threads, associating, by control circuitry, a register circuit with the thread; wherein the register circuit includes information to selectively adjust an ENABLE/DISABLE status for each of one or more SCA mitigation elements included in an SCA mitigation feature associated with the respective physical or virtual processor thread; and selectively adjusting, by the control circuitry, the ENABLE/DISABLE status for each of the one or more SCA mitigation elements included in the an SCA mitigation feature based on one or more control input signals.

A side channel attack (SCA) mitigation system is provided. The system may include, for each of a plurality of physical and/or virtual processor threads, means for associating a register circuit with the thread; wherein the register circuit includes information to selectively control ENABLE/DISABLE status for each of one or more SCA mitigation elements included in an SCA mitigation feature associated with the respective physical or virtual processor thread; and means for selectively adjusting the ENABLE/DISABLE status for each of the one or more SCA mitigation elements included in the an SCA mitigation feature based on one or more control input signals.

A non-transitory storage device that includes instructions is provided. The instructions, when executed by side channel attack (SCA) mitigation control circuitry, cause the SCA mitigation control circuitry to: for each of a plurality of physical and/or virtual processor threads implemented by one or more processor core circuits: associate a register circuit with the respective physical or virtual processor thread; wherein the register circuit includes information to selectively adjust an ENABLE/DISABLE status for each of one or more SCA mitigation elements included in an SCA mitigation feature associated with the respective physical or virtual processor thread; and selectively adjust the ENABLE/DISABLE status for each of the one or more SCA mitigation elements included in the an SCA mitigation feature based on one or more control input signals.

An electronic device is provided. The electronic device may include: processor circuitry that includes one or more physical or virtual processor threads; memory circuitry to store a plurality of SCA mitigation features, each of the plurality of SCA mitigation features including machine-readable instructions to cause the implementation of one or more SCA mitigation elements; a plurality of register circuits, each of the register circuits associated with a respective one of a plurality of physical and/or virtual processor threads; wherein each of the register circuits includes information to selectively adjust an ENABLE/DISABLE status for each of the one or more SCA mitigation elements included in an SCA mitigation feature associated with a respective physical or virtual processor thread implemented by the one or more processor core circuits; control circuitry coupled to each of the plurality of register circuits, the control circuitry to receive one or more control input signals; wherein each of the one or more control input signals is associated with a respective one of the plurality physical and/or virtual processor threads; wherein each of the one or more input signals includes information indicative of the ENABLE/DISABLE status for each of the one or more SCA mitigation elements included in the an SCA mitigation feature.

As used herein, the term "processor cache" and "cache circuitry" refer to cache memory present within a processor or central processing unit (CPU) package. Such processor cache may variously be referred to, and should be considered to include, without limitation, Level 1 (L1) cache, Level 2 (L2) cache, Level 3 (L3) cache, and/or last or lowest level cache (LLC).

Figure 1:
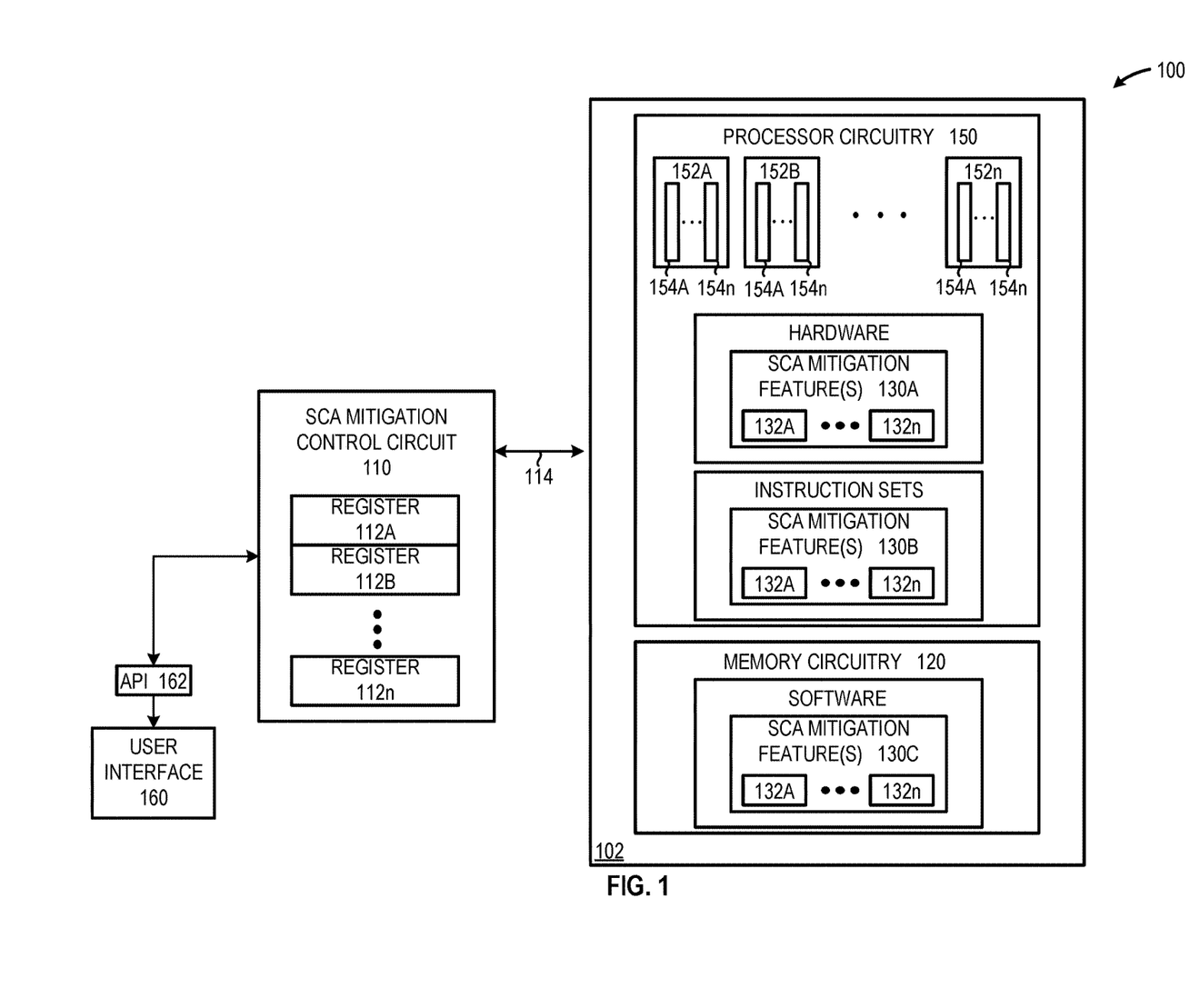
FIG. 1 is a schematic diagram of an illustrative system that includes SCA mitigation control circuitry coupled to memory circuitry that includes a plurality of register circuits and a plurality of SCA mitigation features, each of which includes one or more SCA mitigation elements, in accordance with at least one embodiment described herein.

FIG. 1 is a schematic diagram of an illustrative system 100 that includes SCA mitigation control circuitry 110 that includes a plurality of register circuits 112A-112n (collectively, "register circuits 112") coupled to a system 102 that includes memory circuitry 120, processor circuitry 150, and a plurality of SCA mitigation features 130A-130n (collectively, "SCA mitigation features 130"), each of which includes one or more SCA mitigation elements 132A-132n (collectively, "SCA mitigation elements 132"), in accordance with at least one embodiment described herein. The SCA mitigation control circuitry 110 is communicatively coupled to the system 102, including the memory circuitry 120 and the processor circuitry 150 via one or more communications links or buses 114. The processor circuitry 150 may include any number of processor core circuits 152A-152n (collectively, "processor core circuits 152"), each of the processor core circuits 152 capable of implementing one or more physical and/or virtual processor threads 154A-154n (collectively, "physical and/or virtual processor threads 154") each of the physical and/or virtual processor threads 154 may execute software such as an operating system or one or more applications.

As depicted in FIG. 1, in some embodiments, at least a portion of the SCA mitigation features 130 may include corrective hardware 130A (i.e., hardware-based SCA mitigation features) that is incorporated into or otherwise communicatively coupled to the system 102, for example to the processor circuitry 150. Also as depicted in FIG. 1, in some embodiments, at least a portion of the SCA mitigation features 130 may include corrective code or instructions 130B (i.e., code-based SCA mitigation features) incorporated into instructions 154 executed by the system 102, for example instructions 154 executed by the processor circuitry 150. Also as depicted in FIG. 1, in some embodiments, at least a portion of the SCA mitigation features 130C (i.e., software-based SCA mitigation features) may include one or more SCA corrective and/or preventative software stored in memory circuitry 120 and selectively executable by the processor 150. In embodiments, the one or more software-based SCA mitigation features 130C may include but are not limited to: an application, an applet, or logic capable of preventing, detecting, and/or mitigating the effects of a side-channel attack performed by an adversarial party. The one or more hardware-based SCA mitigation features 130A may include but are not limited to any number and/or combination of electronic components, semiconductor devices, and/or logic elements capable of preventing, detecting, and/or mitigating the effects of a side-channel attack performed by an adversarial party.

In embodiments, each of some or all of the SCA mitigation features 130A-130C may include one or more SCA mitigation elements 132A-132$n$, each of which may perform one or more functions, such as preventing, detecting, and/or mitigating the effects of a side-channel attack. The SCA mitigation elements 132 may include portions of the corrective hardware and/or portions of the one or more machine-readable instructions that form and are included in a particular SCA mitigation feature 130. Thus, the SCA mitigation elements 132 provide a more granular insight to the actions performed by the respective SCA mitigation features 130 with which the features are associated. As discussed above, traditionally, SCA mitigation features 130 were applied on an "all-or-nothing" basis in which each of the SCA mitigation elements 132A-132$n$ associated with each available SCA mitigation feature 130A-130$n$ were applied to each of the physical and/or virtual processor threads 154A-154$n$ implemented by each of the processor core circuits 152A-152$n$. Thereby placing a significant computational burden on the processor circuitry 150 and decreasing overall system performance.

Recognizing that not all physical and/or virtual processor threads 154 implemented by all processor core circuits 152 may require implementation of all of the SCA mitigation elements 132 included in all SCA mitigation features 130A-130$n$, system 100 performance and/or responsiveness may be improved by selectively implementing only those SCA mitigation elements 132 needed to provide the desired level of side-channel attack mitigation for each respective physical or virtual processor thread 154 implemented by the processor circuitry 150. The SCA mitigation control circuitry 110 is thus able to cause the processor circuitry 150 to selectively apply one or more SCA mitigation elements 132 to respective ones of the physical and/or virtual processor threads 154 implemented by the processor circuitry 150. Thus, the system 100 beneficially implements a selective ENABLEMENT/DISABLEMENT of each of the SCA mitigation elements 132 included in some or all of the SCA mitigation features 130 on a per-thread 154 basis.

The SCA mitigation control circuitry 110 associates each of the register circuits 112 with some or all of the physical and/or virtual processor threads 154 implemented by the processor circuitry 150. Each of the register circuits 112A112$n$ stores, holds, or otherwise retains SCA mitigation application information and/or data indicating whether each of the SCA mitigation elements 132A-132$n$ in each of the SCA mitigation features 130A-130$n$ is ENABLED or DISABLED for the respective physical or virtual processor thread 154 associated with the respective register circuit 112. In embodiments, the SCA mitigation application information retained in the register circuits 112 may be static—implementing the same SCA mitigation elements 132 for the duration of the respective physical or virtual processor thread 154 associated with the register circuit 112. In other embodiments, the SCA mitigation application information retained in the register circuits 112 may be dynamic—autonomously and/or selectively implementing different SCA mitigation elements 132 applied to a physical and/or virtual processor thread 154 based on an occurrence of one or more events (detection of potential SCA, etc.) and/or changes in one or more system parameters (application content, user-level/kernel-level context switching, change in security level, etc.). In other embodiments, the SCA mitigation application information retained in the register circuits 112 may be selectively alterable—for example, user input received by the SCA mitigation control circuitry 110 via an application programming interface (API) 162 coupled to a user interface 160.

The SCA mitigation control circuitry 110 includes any number and/or combination of electrical components, optical components, quantum components, semiconductor devices, and/or logic elements capable of receiving system and/or user supplied information and/or data indicative of the one or more SCA mitigation elements 132A-132$n$ to selectively apply to each respective one of at least some of the physical and/or virtual processor threads 154A-154$n$ implemented by the processor circuitry 150. The SCA mitigation control circuitry 110 may also include some or all of the register circuits 112A-112$n$. The SCA mitigation control circuitry 110 may include one or more logic elements or devices capable of executing one or more machine-readable instructions. In embodiments, the processor circuitry 150 may provide all or a portion of the SCA mitigation control circuitry 110.

In embodiments, the SCA mitigation control circuitry 110 may generate SCA mitigation application information that is stored, held, or otherwise retained in each of some or all of the register circuits 112A-112$n$. In embodiments, the SCA mitigation control circuitry 110 may generate an output signal 112 that sets individual bits in each of some or all of the register circuits 112A-112$n$, where each of the individual bits in each of the register circuits 112 serves as an ON/OFF switch for a respective one of the SCA mitigation elements 132A-132$n$. The SCA mitigation control circuitry 110 may include one or more input/output (I/O) communications interfaces coupleable to the communications link 114.

In embodiments, the SCA mitigation control circuitry 110 may be implemented within a central processing unit (CPU) or similar microprocessor structure (graphical processing unit, tensor processing unit, etc.). In other embodiments, the SCA mitigation control circuitry 110 may be implemented as a stand-alone semiconductor die, chip, or chiplet included or otherwise incorporated into a multi-chip module or similar structure. In other embodiments, the SCA mitigation control circuitry 110 may be implemented as an independent device, such as an application specific integrated circuit (ASIC), field programmable gate array (FPGA), or reduced instruction set computer (RISC).

The memory circuitry 120 includes any number and/or combination of electrical components, optical components, quantum components, semiconductor devices, and/or logic elements capable of storing information and/or data including one or more SCA mitigation features 130A-130$n$. In embodiments, the memory circuitry 120 may include some or all of the plurality of register circuits 112A-112n. In embodiments, all or a portion of the memory circuitry 120 may be collocated with the processor circuitry 150. In embodiments, the memory circuitry 120 may include any number and/or combination of non-volatile memory or storage circuits (e.g., read-only memory—ROM) to store or otherwise retain the SCA mitigation features 130A-130n. In embodiments, the memory circuitry 120 may include any number of volatile memory or storage circuits (e.g., random-access memory—RAM) to provide some or all of the register circuits 112A-112n. In embodiments, the memory circuitry 120 may include one or more non-transitory storage devices, such as one or more hard disk drives (HDDs); one or more sold state drives (SSDs); one or more optical storage devices, one or more removable storage devices; or any combination thereof.

Each of some or all of the SCA mitigation features 130A-130n include one or more SCA mitigation elements 132A-132n. Each of the SCA mitigation elements 132 may provide the capability to prevent, detect, or otherwise mitigate at least one aspect of a side-channel attack, such as Spectre or Meltdown. Each of the register circuits 112A-112n may have the same or different sizes. For example, each of the register circuits 112 may have a size of 8-bits, 16-bits, 32-bits, 64-bits, 128-bits, or 256-bits. In embodiments, each of the bits included in the register circuits 112 may determine whether a particular SCA mitigation element 132 in ENABLED or DISABLED for the thread 154 associated with the respective register circuit 112.

The processor circuitry 150 includes any number and/or combination of electrical components, optical components, quantum components, semiconductor devices, and/or logic elements capable of executing machine-readable instructions. In embodiments, the processor circuitry 150 may include a plurality of processor core circuits 152A-152n. In embodiments, each of processor core circuits 152 may provide one or more physical and/or virtual processor threads 154A-154n. The processor circuitry 150 may include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples the processor circuitry 150 may also be an application specific integrated circuit (ASIC) and at least some modules processor core circuits 152 may be implemented as hardware elements of the ASIC.

Figure 2:
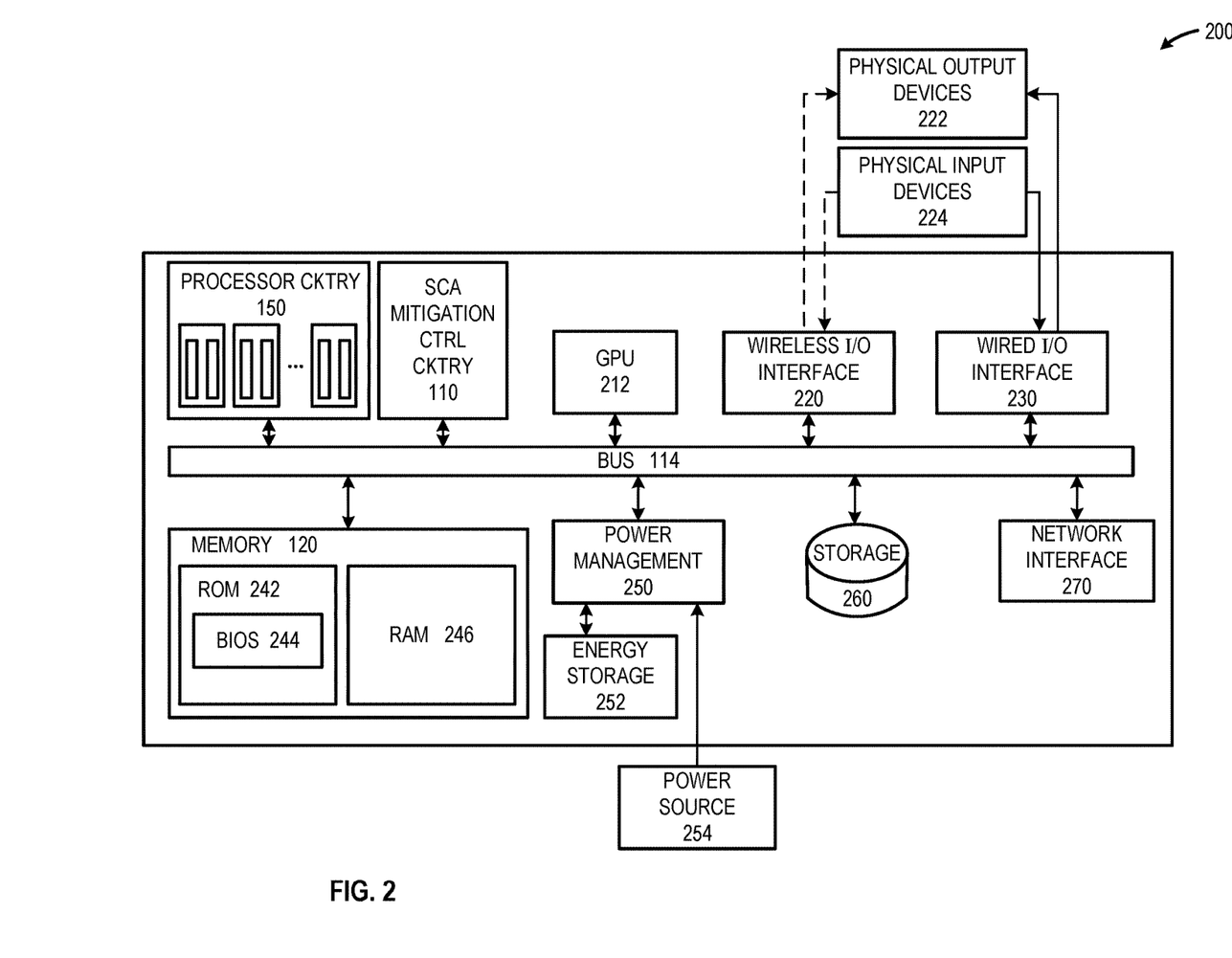
FIG. 2 is a schematic diagram of an illustrative electronic, processor-based, device that includes SCA mitigation control circuitry that selectively executes SCA mitigation elements for each of a plurality of physical or virtual processor threads, in accordance with at least one embodiment described herein.

FIG. 2 is a schematic diagram of an illustrative electronic, processor-based, device 200 that includes SCA mitigation control circuitry 110 that selectively executes SCA mitigation elements 132 for each of the one or more physical and/or virtual processor threads 154A-154n, in accordance with at least one embodiment described herein. The processor-based device 200 may additionally include one or more of the following: a graphical processing unit 212, a wireless input/output (I/O) interface 220, a wired I/O interface 230, system memory 120, power management circuitry 250, a non-transitory storage device 260, and a network interface 270. The following discussion provides a brief, general description of the components forming the illustrative processor-based device 200. Example, non-limiting processor-based devices 200 may include, but are not limited to: smartphones, wearable computers, portable computing devices, handheld computing devices, desktop computing devices, blade server devices, workstations, and similar.

In some embodiments, the processor-based device 200 includes graphics processor circuitry 212 capable of executing machine-readable instructions and generating an output signal capable of providing a display output to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 150 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions. In embodiments, the processor circuitry 150 may provide all or a portion of the SCA mitigation control circuitry 110. In embodiments, the processor circuitry may include memory circuitry 120 to store, hold, or otherwise retain the SCA mitigation features 130 and/or the register circuits 112A-112n.

The processor-based device 200 includes a bus or similar communications link 114 that communicably couples and facilitates the exchange of information and/or data between various system components including the processor circuitry 150, the graphics processor circuitry 212, one or more wireless I/O interfaces 220, one or more wired I/O interfaces 230, the system memory 120, the power management circuitry 250, one or more storage devices 260, and/or one or more network interfaces 270. The processor-based device 200 may be referred to in the singular herein, but this is not intended to limit the embodiments to a single processor-based device 200, since in certain embodiments, there may be more than one processor-based device 200 that incorporates, includes, or contains any number of communicably coupled, collocated, or remote networked circuits or devices.

The processor circuitry 150 may include any number, type, or combination of currently available or future developed devices capable of executing machine-readable instructions. The processor circuitry 150 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 2 are of conventional design. Consequently, such blocks need not be described in further detail herein, as they will be understood by those skilled in the relevant art. The bus 114 that interconnects at least some of the components of the processor-based device 200 may employ any currently available or future developed serial or parallel bus structures or architectures.

The system memory 120 may include read-only memory ("ROM") 242 and random access memory ("RAM") 246. A portion of the ROM 242 may be used to store or otherwise retain a basic input/output system ("BIOS") 244. The BIOS 244 provides basic functionality to the processor-based device 200, for example by causing the processor circuitry 150 to load and/or execute one or more machine-readable instructions, such as the operating system instructions, and/or one or more applications. In embodiments, at least some of the one or more machine-readable instructions cause at least a portion of the processor circuitry 150 to provide, create, produce, transition, and/or function as a dedicated, specific, and particular machine, for example a word processing machine, a digital image acquisition machine, a media playing machine, a gaming system, a communications device, a smartphone, or similar. In embodiments, the RAM 246 may include all or a portion of the memory circuitry 120.

The processor-based device 200 may include at least one wireless input/output (I/O) interface 220. The at least one wireless I/O interface 220 may be communicably coupled to one or more physical output devices 222 (tactile devices, video displays, audio output devices, hardcopy output devices, etc.). The at least one wireless I/O interface 220 may communicably couple to one or more physical input devices 224 (pointing devices, touchscreens, keyboards, tactile devices, etc.). The at least one wireless I/O interface 220 may include any currently available or future developed wireless I/O interface. Example wireless I/O interfaces include, but are not limited to: BLUETOOTH®, near field communication (NFC), and similar.

The processor-based device 200 may include one or more wired input/output (I/O) interfaces 230. The at least one wired I/O interface 230 may be communicably coupled to one or more physical output devices 222 (tactile devices, video displays, audio output devices, hardcopy output devices, etc.). The at least one wired I/O interface 230 may be communicably coupled to one or more physical input devices 224 (pointing devices, touchscreens, keyboards, tactile devices, etc.). The wired I/O interface 230 may include any currently available or future developed I/O interface. Example wired I/O interfaces include but are not limited to: universal serial bus (USB), IEEE 1394 ("FireWire"), and similar.

The processor-based device 200 may include one or more communicably coupled, non-transitory, data storage devices 260. The data storage devices 104 may include one or more hard disk drives (HDDs) and/or one or more solid-state storage devices (SSDs). The one or more data storage devices 260 may include any current or future developed storage appliances, network storage devices, and/or systems. Non-limiting examples of such data storage devices 104 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 104 may include one or more removable storage devices, such as one or more flash drives, flash memories, flash storage units, or similar appliances or devices capable of communicable coupling to and decoupling from the processor-based device 200.

The one or more data storage devices 104 may include interfaces or controllers (not shown) communicatively coupling the respective storage device or system to the bus 114. The one or more data storage devices 260 may store, retain, or otherwise contain machine-readable instructions, data structures, program modules, data stores, databases, logical structures, and/or other data useful to the processor circuitry 150 and/or graphics processor circuitry 212 and/or one or more applications executed on or by the processor circuitry 150 and/or graphics processor circuitry 212. In some instances, one or more data storage devices 260 may be communicably coupled to the processor circuitry 150, for example via the bus 114 or via one or more wired communications interfaces 230 (e.g., Universal Serial Bus or USB); one or more wireless communications interfaces 220 (e.g., Bluetooth®, Near Field Communication or NFC); and/or one or more network interfaces 270 (IEEE 802.3 or Ethernet, IEEE 802.11, or WiFi®, etc.).

The one or more data storage devices 260 stores all or a portion of the instructions executed, at least in part, by the processor circuitry 150. The one or more data storage devices 104 may store, include, or otherwise retain operating system instructions. The operating system instructions may include but are not limited to any version up to the latest release of: Windows®; OSx®; iOS®; Android®; Linux®; and similar. The one or more storage devices 260 may store, include, or otherwise retain application instructions executed by the processor circuitry 150. Such applications may include but are not limited to: productivity software: communications software; entertainment software; audio and/or video playback software; or similar.

The processor-based device 200 may include power management circuitry 250 that controls one or more operational aspects of the energy storage device 252. In embodiments, the energy storage device 252 may include one or more primary (i.e., non-rechargeable) or secondary (i.e., rechargeable) batteries or similar energy storage devices. In embodiments, the energy storage device 252 may include one or more supercapacitors or ultracapacitors. In embodiments, the power management circuitry 250 may alter, adjust, or control the flow of energy from an external power source 254 to the energy storage device 252 and/or to the processor-based device 200. The power source 254 may include, but is not limited to, a solar power system, a commercial electric grid, a portable generator, an external energy storage device, or any combination thereof.

For convenience, the processor circuitry 150, the storage device 260, the system memory 120, the graphics processor circuitry 212, the wireless I/O interface 220, the wired I/O interface 230, the power management circuitry 250, and the network interface 270 are illustrated as communicatively coupled to each other via the bus 114, thereby providing connectivity between the above-described components. In alternative embodiments, the above-described components may be communicatively coupled in a different manner than illustrated in FIG. 2. For example, one or more of the above-described components may be directly coupled to other components, or may be coupled to each other, via one or more intermediary components (not shown). In another example, one or more of the above-described components may be integrated into the processor circuitry 150 and/or the graphics processor circuitry 212. In some embodiments, all or a portion of the bus 114 may be omitted and the components are coupled directly to each other using suitable wired or wireless connections.

Figure 3:
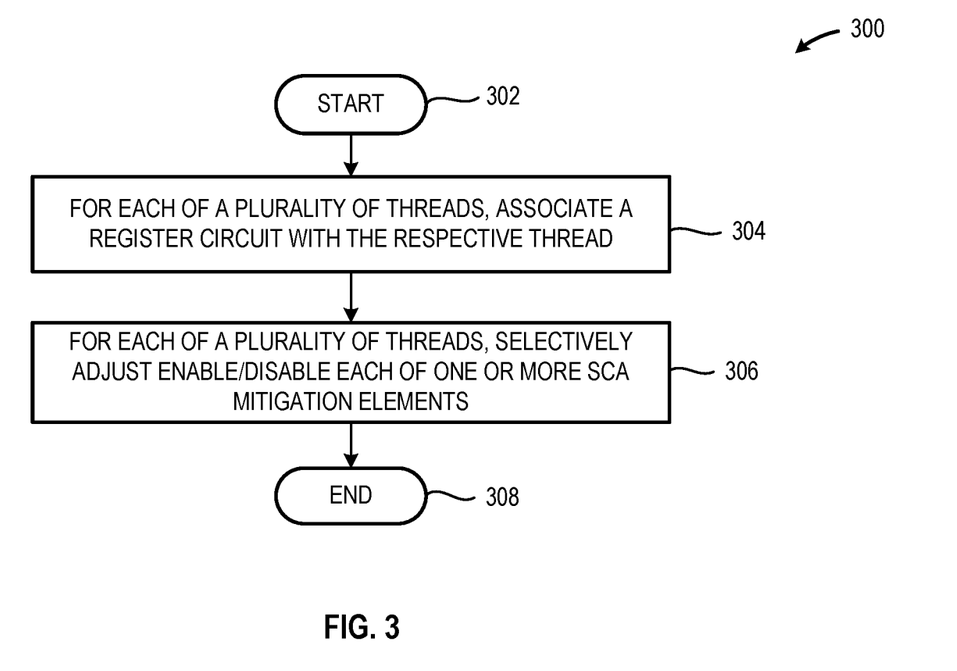
FIG. 3 is a high-level flow diagram of an illustrative method of causing processor circuitry to selectively implement one or more SCA mitigation elements for each of the physical or virtual processor threads, in accordance with at least one embodiment described herein.

FIG. 3 is a high-level flow diagram of an illustrative method 300 of causing processor circuitry 150 to selectively implement one or more SCA mitigation elements 132A-132n for each of the physical and/or virtual processor threads 154A-154n implemented the processor circuitry 150, in accordance with at least one embodiment described herein. A plurality of register circuits 112A-112n are used to store, hold, or otherwise retain information and/or data indicative of the ENABLED/DISABLED status for each of the SCA mitigation elements 132A-132n included in each of at least some of the SCA mitigation features 130A-130n for each of the physical and/or virtual processor threads 154A-154n implemented by the processor circuitry 150. SCA mitigation control circuitry 110 associates each physical and/or virtual processor thread 154A-154n implemented by the processor circuitry 150 with one or more of the register circuits 112A-112n. The SCA mitigation control circuitry 110 also generates an output signal 112 that includes the information and/or data stored, held, or otherwise retained in the one or more register circuits 112A-112n. The method 300 commences at 302.

At 304, the SCA mitigation control circuitry 110 associates at least one register circuit 112A-112n with each of at least some of the physical and/or virtual processor threads 154A-154n implemented by each of at least some of the processor core circuits 152A-152n. In embodiments, the SCA mitigation control circuitry 110 may associate all or a portion of a register circuit 112 with a physical or virtual processor thread 154 upon implementation of the respective physical or virtual processor thread 154. For example, the SCA mitigation control circuitry 110 may associate 64-bits of a 128-bit register circuit 112 with a physical or virtual processor thread 154 upon implementation of the respective physical or virtual processor thread 154. In embodiments, the SCA mitigation control circuitry 110 may reset or otherwise clear all or a portion of the register circuit 112 upon termination of the respective physical or virtual processor thread 154.

At 306, for each of the physical and/or virtual processor threads 154 implemented by the one or more processor core circuits 152, the SCA mitigation control circuitry 110 selectively adjusts the ENABLE/DISABLE status of each of one or more SCA mitigation elements 132A-132n included in each respective one of one or more SCA mitigation features 130A-130n. In embodiment, for each of the physical and/or virtual processor threads 154 implemented by one or more processor core circuits 152, the SCA mitigation control circuitry 110 may generate one or more output signals 112, each containing or otherwise conveying information and/or data representative of the ENABLE/DISABLE status of each of the one or more SCA mitigation elements 132A-132n included in each respective one of one or more SCA mitigation features 130A-130n. In embodiments, the SCA mitigation control circuitry 110 may autonomously, selectively, ENABLE or DISABLE individual SCA mitigation elements 132 for a particular physical or virtual processor thread 154 based upon the context (e.g., user-level context or kernel-level context) based upon a determined level of security assigned to the respective physical or virtual processor thread 154. The method 300 concludes at 308.

Figure 4:
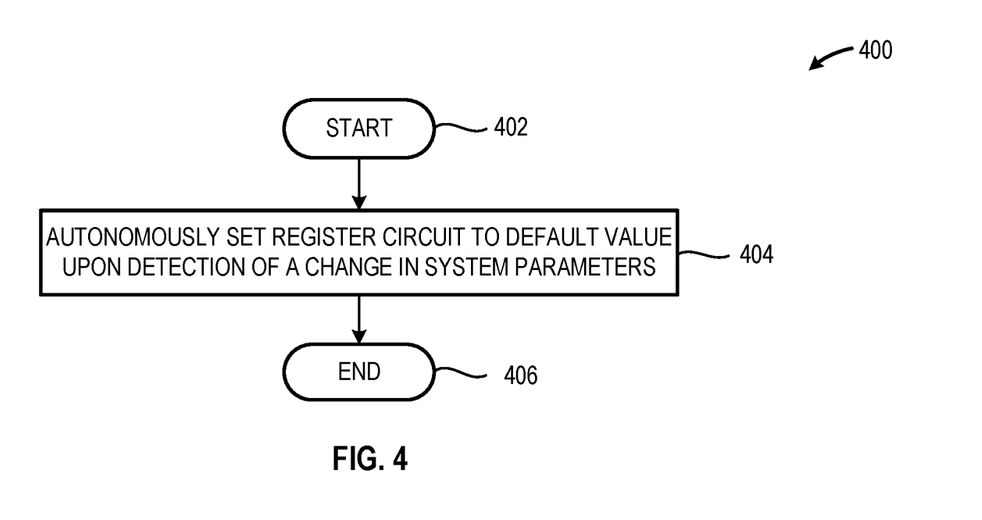
FIG. 4 is a high-level flow diagram of an illustrative method of autonomously setting the information and/or data stored, held, or otherwise retained in a register circuit to one or more default values upon detecting a context switch in a physical or virtual processor thread, in accordance with at least one embodiment described herein.

FIG. 4 is a high-level flow diagram of an illustrative method 400 of autonomously setting the information and/or data stored, held, or otherwise retained in a register circuit 112 to one or more default values upon detecting a change or alteration of at least one system status, in accordance with at least one embodiment described herein. Examples of such changes or alterations in system status may include but are not limited to: a context switch in a physical and/or virtual processor thread 154 implemented by the processor circuitry 150; implementation and/or termination of one or more virtual entities in a physical and/or virtual processor thread 154 implemented by the processor circuitry 150; and, entry to/exit from a secure guard exchange (SGX) enclave by a physical and/or virtual processor thread 154 implemented by the processor circuitry 150.

For example, in embodiments, at least some of the physical and/or virtual processor threads 154A-154n implemented by the processor core circuits 152A-152n may reversibly or irreversibly transition, during execution, between a first context having a first security requirement and a second context having a second security requirement. In such embodiments, the SCA mitigation control circuitry 110 may set/reset the information and/or data stored, held, or otherwise retained in the register circuit 112 associated with the physical or virtual processor thread 154 to a level commensurate with the contextual security requirements of the respective physical or virtual processor thread 154.

In embodiments, the SCA mitigation control circuitry 110 may autonomously alter, adjust, or control the contents of the register circuit 112 in response to one or more system parameters and/or an occurrence of one or more events, such as the detection of one or more side channel attacks on the physical or virtual processor thread 154, the processor core circuit 152 hosting the physical or virtual processor thread 154, and/or the processor circuitry 150. The method 400 commences at 402.

At 404, the SCA mitigation control circuitry 110 autonomously sets the information and/or data stored, held, or otherwise retained in a register circuit 112 to one or more default values upon detecting one or more changes in at least one system status. In some embodiments, the SCA mitigation control circuitry 110 may receive one or more input signals from the processor circuitry 150 containing information and/or data indicative of a change in at least one system status. In response to receipt of the input signal, the SCA mitigation control circuitry 110 may set the information and/or data stored, held, or otherwise retained in the register circuit 112 based on the detected change in at least one system status caused by the respective physical or virtual processor thread 154 associated with the register circuit 112. The method 400 concludes at 406.

Figure 5:
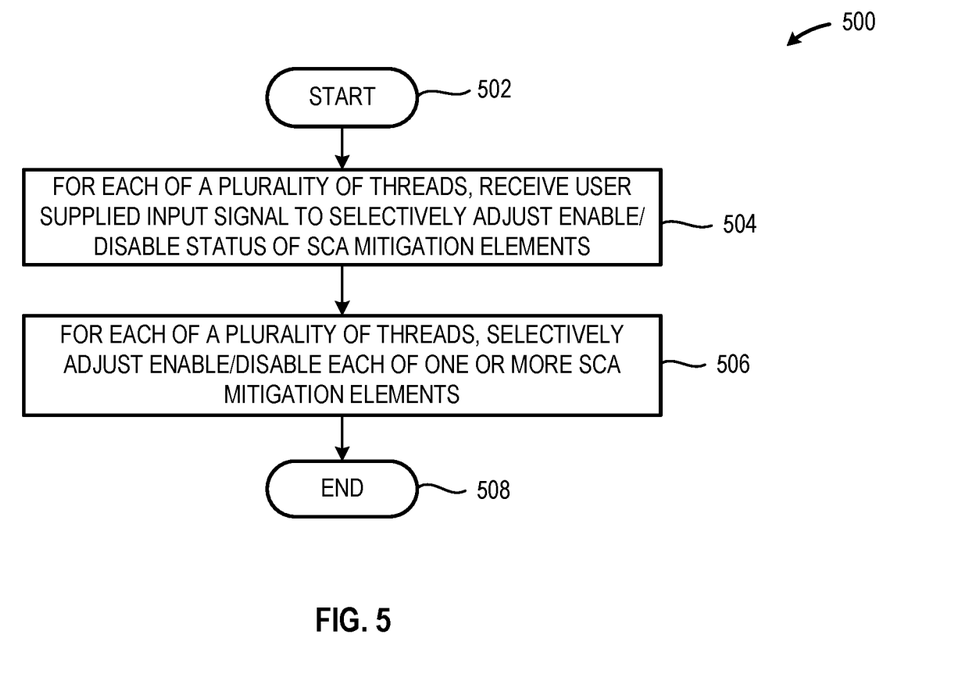
FIG. 5 is a high-level flow diagram of an illustrative method of adjusting the information and/or data stored, held, or otherwise retained in the register circuit in response to a manual input received via a user interface, in accordance with at least one embodiment described herein.

FIG. 5 is a high-level flow diagram of an illustrative method 500 of adjusting the information and/or data stored, held, or otherwise retained in the register circuit 112 in response to a manual input received via a user interface 160, in accordance with at least one embodiment described herein. In embodiments, a user may provide an input, via the user interface 160, that includes information indicative of a desired security level for one or more physical and/or virtual processor threads 154. In such instances, the user may provide an input, via a user interface 160 coupled to an API 162, that includes information representative of the desired level of SCA mitigation provided by the SCA mitigation control circuitry 110. The method 500 commences at 502.

At 504, the SCA mitigation control circuitry 110 receives one or more input signals that include information and/or data representative of a user-supplied level of security to apply to one or more physical and/or virtual processor threads 154 implemented by the processor core circuits 152. In a multi-user environment, such user-supplied signals may originate with a single user and the SCA mitigation control circuitry 110 may generate an output signal 112 for communication to those register circuits 112 associated with physical and/or virtual processor threads 154 associated with the respective user. In a multi-user environment, such user-supplied signals may originate with a system administrator and the SCA mitigation control circuitry 110 may generate an output signal 112 for selective communication to some or all of the register circuits 112A-112n associated with physical and/or virtual processor threads 154A-154n implemented by some or all of the processor core circuits 152A-152n.

At 506, the SCA mitigation control circuitry 110 communicates an output signal 112 to one or more register circuits 112. The method 500 concludes at 508.

While FIGS. 3, 4, and 5 illustrate various operations according to one or more embodiments, it is to be understood that not all of the operations depicted in FIGS. 3, 4, and 5 are necessary for other embodiments. Indeed, it is fully contemplated herein that in other embodiments of the present disclosure, the operations depicted in FIGS. 3, 4, and 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instructions and/or data recorded on non-transitory computer readable storage mediums. Firmware may be embodied as code, instructions or instructions and/or data that are hard-coded (e.g., nonvolatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods of selectively implementing SCA mitigation elements on a per-thread basis to mitigate the effects of side channel attacks. Processor core circuits implement one or more physical and/or virtual processor threads. Each of a plurality of SCA mitigation features include one or more SCA mitigation elements. SCA mitigation control circuitry associates a register circuit with each physical and/or virtual processor thread implemented by each of the processor core circuits. The SCA mitigation control circuitry selectively ENABLES/DISABLES one or more SCA mitigation elements for each of the physical and/or virtual processor threads. The ENABLEMENT/DISABLEMENT of each of the SCA mitigation elements may be autonomously adjusted by the SCA mitigation control circuitry and/or manually adjusted via one or more user inputs provided to the SCA mitigation control circuitry.

The following examples pertain to further embodiments. The following examples of the present disclosure may comprise subject material such as at least one device, a method, at least one machine-readable medium for storing instructions that when executed cause a machine to perform acts based on the method, means for selectively implementing SCA mitigation elements on a per-thread basis to mitigate the effects of side channel attacks.

According to example 1, there is provided a side channel attack (SCA) mitigation control system. The system may include: memory circuitry to store a plurality of SCA mitigation features, each of the plurality of SCA mitigation features including machine-readable instructions to cause the implementation of one or more SCA mitigation elements; a plurality of register circuits, each of the register circuits associated with a respective one of a plurality of physical and/or virtual processor threads implemented by processor core circuits; wherein each of the register circuits includes information to selectively adjust an ENABLE/DISABLE status for each of the one or more SCA mitigation elements included in an SCA mitigation feature associated with a respective physical and/or virtual processor thread implemented by the one or more processor core circuits; control circuitry coupled to each of the plurality of register circuits, the control circuitry to receive one or more control input signals; wherein each of the one or more control input signals is associated with a respective one of the plurality physical and/or virtual processor threads; wherein each of the one or more input signals includes information indicative of the ENABLE/DISABLE status for each of the one or more SCA mitigation elements included in the an SCA mitigation feature.

Example 2 may include elements of example 1 where the control circuitry may further: receive one or more thread status signals, the one or more thread status signals including information representative of one or more parameters associated with a physical and/or virtual processor thread; and autonomously generate the control input signal to selectively adjust the ENABLE/DISABLE status of the one or more SCA mitigation elements included in the an SCA mitigation feature associated with a respective physical and/or virtual processor thread based on the received information representative of one or more parameters associated with the physical and/or virtual processor thread.

Example 3 may include elements of examples 1 or 2 where the control circuitry may further: autonomously set a register circuit to a first default value upon receipt of a signal containing information indicative of a context switch of the physical and/or virtual processor thread associated with the register circuit from a user-level operating mode to a kernel-level operating mode.

Example 4 may include elements of any of examples 1 through 3 where the control circuitry may further: autonomously set a register circuit to a second default value upon receipt of a signal containing information indicative of a context switch of the physical and/or virtual processor thread associated with the register circuit from a kernel-level operating mode to a user-level operating mode.

Example 5 may include elements of any of examples 1 through 4 where the information to control the ENABLE/DISABLE status for each of the one or more SCA mitigation elements included in an SCA mitigation feature may include: one or more user-accessible settings to selectively adjust the ENABLE/DISABLE status for each of the one or more SCA mitigation elements included in a register circuit associated with a physical and/or virtual processor thread.

Example 6 may include elements of any of examples 1 through 5 where the one or more user-accessible settings to adjust the ENABLE/DISABLE status for each of the one or more SCA mitigation elements included in the register circuit associated with the thread may include: an application programming interface (API) included in an operating system executable by the physical and/or virtual processor thread.

Example 7 may include elements of any of examples 1 through 6 where the plurality of register circuits comprise a plurality of model specific registers (MSRs).

According to example 8, there is provided a side channel attack (SCA) mitigation method. The method may include, for each of a plurality of physical and/or virtual processor threads implemented by one or more processor core circuits, associating, by control circuitry, a register circuit with the thread; wherein the register circuit includes information to selectively adjust an ENABLE/DISABLE status for each of one or more SCA mitigation elements included in an SCA mitigation feature associated with the physical or virtual processor thread; and selectively adjusting, by the control circuitry, the ENABLE/DISABLE status for each of the one or more SCA mitigation elements included in the an SCA mitigation feature based on one or more control input signals.

Example 9 may include elements of example 8, and the method may further include, for each of at least some of the plurality of physical and/or virtual processor threads, receiving a thread status signal that includes information representative of one or more parameters associated with the respective physical or virtual processor thread; and autonomously generating the one or more control input signals to selectively adjust the ENABLE/DISABLE status of the one or more SCA mitigation elements associated with the respective physical and/or virtual processor thread based on the received information representative of one or more parameters associated with the respective physical and/or virtual processor thread.

Example 10 may include elements of any of examples 8 or 9 and the method may further include, for each of at least some of the plurality of physical and/or virtual processor threads, autonomously setting, by the control circuitry, the register circuit to a first default value upon receipt of a signal containing information indicative of a context switch of the respective physical or virtual processor thread from a user-level operating mode to a kernel-level operating mode.

Example 11 may include elements of any of examples 8 through 10, and the method may further include, for each of at least some of the plurality of physical and/or virtual processor threads, autonomously setting, by the control circuitry, the register circuit to a second default value upon receipt of a signal containing information indicative of a context switch of the respective physical or virtual processor thread associated with the register circuit from a kernel-level operating mode to a user-level operating mode.

Example 12 may include elements of any of examples 8 through 11, and the method may further include, for each of at least some of the plurality of physical and/or virtual processor threads, receiving, by the control circuitry, one or more user-supplied input signals to selectively adjust the ENABLE/DISABLE status for each of the one or more SCA mitigation elements; and selectively adjusting, by the control circuitry, the register circuit to the user-supplied ENABLE/DISABLE status for each of the one or more SCA mitigation elements associated with the respective physical or virtual processor thread.

Example 13 may include elements of any of examples 8 through 12 where receiving the one or more user-supplied input signals to selectively adjust the ENABLE/DISABLE status for each of the one or more SCA mitigation elements included in the register circuit further includes: receiving, by the control circuitry via an application programming interface (API) included in an operating system executable by the physical or virtual processor thread, the one or more user-supplied input signals to selectively adjust the ENABLE/DISABLE status for each of the one or more SCA mitigation elements.

Example 14 may include elements of any of examples 8 through 13 where associating the register circuit with the physical or virtual processor thread further includes: associating at least one model specific register (MSR) with the respective physical or virtual processor thread.

According to example 15, there is provided a side channel attack (SCA) mitigation system. The system may include, for each of a plurality of physical and/or virtual processor threads implemented by one or more processor core circuits, means for associating a register circuit with the thread; wherein the register circuit includes information to selectively control ENABLE/DISABLE status for each of one or more SCA mitigation elements included in an SCA mitigation feature associated with the respective physical or virtual processor thread; and means for selectively adjusting the ENABLE/DISABLE status for each of the one or more SCA mitigation elements included in the an SCA mitigation feature based on one or more control input signals.

Example 16 may include elements of example 15 and the system may further include, for each of at least some of the plurality of physical and/or virtual processor threads, means for receiving a thread status signal that includes information representative of one or more parameters associated with the respective physical or virtual processor thread; and means for autonomously generating the one or more control input signals to selectively adjust the ENABLE/DISABLE status of the one or more SCA mitigation elements associated with the respective physical or virtual processor thread based on the received information representative of one or more parameters associated with the respective physical or virtual processor thread.

Example 17 may include elements of any of examples 15 or 16, and the method may further include, for each of at least some of the plurality of physical and/or virtual processor threads, means for autonomously setting the register circuit to a first default value upon receipt of a signal containing information indicative of a context switch of the respective physical or virtual processor thread from a user-level operating mode to a kernel-level operating mode.

Example 18 may include elements of any of examples 15 through 17 and the method may further include, for each of at least some of the plurality of physical and/or virtual processor threads: means for autonomously setting the register circuit to a second default value upon receipt of a signal containing information indicative of a context switch of the respective physical or virtual processor thread associated with the register circuit from a kernel-level operating mode to a user-level operating mode.

Example 19 may include elements of any of examples 15 through 18 and the system may further include, for each of at least some of the plurality of physical and/or virtual processor threads: means for receiving one or more user-supplied input signals to adjust the ENABLE/DISABLE status for each of the one or more SCA mitigation elements; and means for setting the register circuit to the user-supplied ENABLE/DISABLE status for each of the one or more SCA mitigation elements associated with the respective physical or virtual processor thread.

Example 20 may include elements of any of examples 15 through 19 where the means for receiving the one or more user-supplied input signals to adjust the ENABLE/DISABLE status for each of the one or more SCA mitigation elements included in the register circuit further includes: means for receiving, via an application programming interface (API) included in an operating system executable by the physical or virtual processor thread, the one or more user-supplied input signals to selectively adjust the ENABLE/DISABLE status for each of the one or more SCA mitigation elements.

Example 21 may include elements of any of examples 15 through 20 where the means for associating the register circuit associated with the physical or virtual processor thread further include: means for associating at least one model specific register (MSR) with the respective physical or virtual processor thread.

According to example 22, there is provided a non-transitory storage device that includes instructions. The instructions, when executed by side channel attack (SCA) mitigation control circuitry, cause the SCA mitigation control circuitry to: for each of a plurality of physical and/or virtual processor threads: associate a register circuit with the respective physical or virtual processor thread; wherein the register circuit includes information to selectively adjust an ENABLE/DISABLE status for each of one or more SCA mitigation elements included in an SCA mitigation feature associated with the respective physical or virtual processor thread; and selectively adjust the ENABLE/DISABLE status for each of the one or more SCA mitigation elements included in the an SCA mitigation feature based on one or more control input signals.

Example 23 may include elements of example 22 where the instructions further cause the SCA mitigation control circuitry to, for each of at least some of the plurality of physical and/or virtual processor threads: receive a thread status signal that includes information representative of at least one system status associated with the respective physical or virtual processor thread; and autonomously generate the one or more control input signals to selectively adjust the ENABLE/DISABLE status of the one or more SCA mitigation elements associated with the respective physical or virtual processor thread based on the received information representative of one or more parameters associated with the respective physical or virtual processor thread.

Example 24 may include elements of any of examples 22 or 23 where the instructions further cause the SCA mitigation control circuitry to, for each of at least some of the plurality of physical and/or virtual processor threads: autonomously set the register circuit to a first default value upon receipt of a signal containing information indicative of a context switch of the respective physical or virtual processor thread from a user-level operating mode to a kernel-level operating mode.

Example 25 may include elements of any of examples 22 through 24 where the instructions further cause the SCA mitigation control circuitry to, for each of at least some of the plurality of physical and/or virtual processor threads: autonomously set the register circuit to a second default value upon receipt of a signal containing information indicative of a context switch of the respective physical or virtual processor thread associated with the register circuit from a kernel-level operating mode to a user-level operating mode.

Example 26 may include elements of any of examples 22 through 25 where the instructions further cause the SCA mitigation control circuitry to, for each of at least some of the plurality of physical and/or virtual processor threads: receive one or more user-supplied input signals to selectively adjust the ENABLE/DISABLE status for each of the one or more SCA mitigation elements; and selectively adjust the register circuit to the user-supplied ENABLE/DISABLE status for each of the one or more SCA mitigation elements associated with the respective physical or virtual processor thread.

Example 27 may include elements of any of examples 22 through 26 where the instructions that cause the SCA mitigation control circuitry to receive the one or more user-supplied input signals to selectively adjust the ENABLE/DISABLE status for each of the one or more SCA mitigation elements included in the register circuit further cause the SCA mitigation control circuitry to: receive, via an application programming interface (API) included in an operating system executable by the physical or virtual processor thread, the one or more user-supplied input signals to selectively adjust the ENABLE/DISABLE status for each of the one or more SCA mitigation elements.

Example 28 may include elements of any of examples 22 through 27 where the instructions that cause the SCA mitigation control circuitry to associate the register circuit with the physical or virtual processor thread further cause the SCA mitigation control circuitry to: associate at least one model specific register (MSR) with the physical or virtual processor thread.

According to example 29, there is provided an electronic device. The electronic device may include: processor circuitry that includes one or more core circuits capable of implementing a plurality of physical and/or virtual processor threads; memory circuitry to store a plurality of SCA mitigation features, each of the plurality of SCA mitigation features including machine-readable instructions to cause the implementation of one or more SCA mitigation elements; a plurality of register circuits, each of the register circuits associated with a respective one of a plurality of physical and/or virtual processor threads implemented by one or more processor core circuits; wherein each of the register circuits includes information to selectively adjust an ENABLE/DISABLE status for each of the one or more SCA mitigation elements included in an SCA mitigation feature associated with a respective physical or virtual processor thread implemented by the one or more processor core circuits; control circuitry coupled to each of the plurality of register circuits, the control circuitry to receive one or more control input signals; wherein each of the one or more control input signals is associated with a respective one of the plurality physical and/or virtual processor threads; wherein each of the one or more input signals includes information indicative of the ENABLE/DISABLE status for each of the one or more SCA mitigation elements included in the an SCA mitigation feature.

Example 30 may include elements of example 29 where the control circuitry may further: receive one or more thread status signals, the one or more thread status signals including information representative of at least one system status associated with a physical or virtual processor thread; and autonomously generate the control input signal to selectively adjust the ENABLE/DISABLE status of the one or more SCA mitigation elements included in the an SCA mitigation feature associated with a respective physical or virtual processor thread based on the received information representative of one or more parameters associated with the physical or virtual processor thread.

Example 31 may include elements of any of examples 29 or 30 where the control circuitry may further: autonomously set a register circuit to a first default value upon receipt of a signal containing information indicative of a context switch of the physical or virtual processor thread associated with the register circuit from a user-level operating mode to a kernel-level operating mode.

Example 32 may include elements of any of examples 29 through 31 where the control circuitry may further: autonomously set a register circuit to a second default value upon receipt of a signal containing information indicative of a context switch of the physical or virtual processor thread associated with the register circuit from a kernel-level operating mode to a user-level operating mode.

Example 33 may include elements of any of examples 29 through 32 where the information to control the ENABLE/DISABLE status for each of the one or more SCA mitigation elements included in an SCA mitigation feature comprises: one or more user-accessible settings to selectively adjust the ENABLE/DISABLE status for each of the one or more SCA mitigation elements included in a register circuit associated with the physical or virtual processor thread.

Example 34 may include elements of any of examples 29 through 33 where the one or more user-accessible settings to adjust the ENABLE/DISABLE status for each of the one or more SCA mitigation elements included in the register circuit associated with the physical or virtual processor thread includes: an application programming interface (API) included in an operating system executable by the physical or virtual processor thread.

Example 35 may include elements of any of examples 29 through 34 where the plurality of register circuits comprise a plurality of model specific registers (MSRs).

According to example 36, there is provided a system to selectively, reversibly ENABLE SCA mitigation elements on a per-thread basis to mitigate the effects of a side-channel attack, the system being arranged to perform the method of any of examples 8 through 14.

According to example 37, there is provided a chipset arranged to perform the method of any of examples 8 through 14.

According to example 38, there is provided at least one machine readable medium comprising a plurality of instructions that, in response to be being executed on a computing device, cause the computing device to carry out the method according to any of examples 8 through 14.

According to example 39, there is provided a device configured to selectively, reversibly ENABLE SCA mitigation elements on a per-thread basis to mitigate the effects of a side-channel attack, the device being arranged to perform the method of any of examples 8 through 14.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A side channel attack (SCA) mitigation control system, comprising:
   memory circuitry to store a plurality of SCA mitigation features, each of the plurality of SCA mitigation features including machine-readable instructions to cause an implementation of one or more SCA mitigation elements;
   a plurality of register circuits, each of the register circuits associated with a respective one of a plurality of processor threads implemented by one or more processor core circuits;
      wherein each of the register circuits includes information to selectively adjust an ENABLE/DISABLE status for each of the one or more SCA mitigation elements included in an SCA mitigation feature associated with a respective processor thread implemented by the one or more processor core circuits;
   control circuitry coupled to each of the plurality of register circuits, the control circuitry to receive one or more control input signals;
      wherein each of the one or more control input signals is associated with a respective one of the plurality processor threads;
      wherein each of the one or more input signals includes information indicative of the ENABLE/DISABLE status for each of the one or more SCA mitigation elements included in the SCA mitigation feature.

2. The SCA mitigation control system of claim 1, the control circuitry to further:
  receive one or more thread status signals, the one or more thread status signals including information representative of at least one system status associated with a respective one of the plurality of processor threads; and
  autonomously generate the control input signal to selectively adjust the ENABLE/DISABLE status of the one or more SCA mitigation elements included in the an SCA mitigation feature associated with the respective one of the plurality of processor threads based on the received information representative of one or more parameters associated with the respective one of the plurality of processor threads.

3. The SCA mitigation control system of claim 1, the control circuitry to further:
  autonomously set a register circuit to a first default value upon receipt of a signal containing information indicative of a context switch of the respective one of the plurality of processor threads associated with the register circuit from a user-level operating mode to a kernel-level operating mode.

4. The SCA mitigation control system of claim 1, the control circuitry to further:
  autonomously set a register circuit to a second default value upon receipt of a signal containing information indicative of a context switch of the respective one of the plurality of processor threads associated with the register circuit from a kernel-level operating mode to a user-level operating mode.

5. The SCA mitigation control system of claim 1 wherein the information to control the ENABLE/DISABLE status for each of the one or more SCA mitigation elements included in an SCA mitigation feature comprises:
  one or more user-accessible settings to selectively adjust the ENABLE/DISABLE status for each of the one or more SCA mitigation elements included in a register circuit associated with the respective one of the plurality of processor threads.

6. The SCA mitigation control system of claim 5 wherein the one or more user-accessible settings to adjust the ENABLE/DISABLE status for each of the one or more SCA mitigation elements included in the register circuit associated with the respective one of the plurality of processor threads comprises:
  an application programming interface (API) included in an operating system executable by the respective one of the plurality of processor threads.

7. The SCA mitigation control system of claim 1 wherein the plurality of register circuits comprise a plurality of model specific registers (MSRs).

8. A side channel attack (SCA) mitigation method, comprising:
  for each of a plurality of processor threads initiated by one or more processor core circuits:
    associating, by control circuitry, a respective register circuit with each of the plurality of processor threads;
      wherein the register circuit includes information to selectively adjust an ENABLE/DISABLE status for each of one or more SCA mitigation elements included in an SCA mitigation feature associated with the respective one of the plurality of processor threads; and
    selectively adjusting, by the control circuitry, the ENABLE/DISABLE status for each of the one or more SCA mitigation elements included in the an SCA mitigation feature based on one or more control input signals.

9. The SCA mitigation control method of claim 8, further comprising:
  for each of at least some of the plurality of processor threads:
    receiving a thread status signal that includes information representative of at least one system status associated with the respective one of the plurality of processor threads; and
    autonomously generating the one or more control input signals to selectively adjust the ENABLE/DISABLE status of the one or more SCA mitigation elements associated with the respective one of the plurality of processor threads based on the received information representative of the at least one system status associated with the respective one of the plurality of processor threads.

10. The SCA mitigation control method of claim 8, further comprising:
  for each of at least some of the plurality of processor threads:
    autonomously setting, by the control circuitry, the register circuit to a first default value upon receipt of a signal containing information indicative of a context switch of the respective one of the plurality of processor threads from a user-level operating mode to a kernel-level operating mode.

11. The SCA mitigation control method of claim 8, further comprising:
  for each of at least some of the plurality of processor threads:
    autonomously setting, by the control circuitry, the register circuit to a second default value upon receipt of a signal containing information indicative of a context switch of the respective one of the plurality of processor threads associated with the register circuit from a kernel-level operating mode to a user-level operating mode.

12. The SCA mitigation control method of claim 8, further comprising:
  for each of at least some of the plurality of processor threads:
    receiving, by the control circuitry, one or more user-supplied input signals to selectively adjust the ENABLE/DISABLE status for each of the one or more SCA mitigation elements; and
    selectively adjusting, by the control circuitry, the register circuit to the user-supplied ENABLE/DISABLE status for each of the one or more SCA mitigation elements associated with the respective one of the plurality of processor threads.

13. The SCA mitigation control method of claim 12 wherein receiving the one or more user-supplied input signals to selectively adjust the ENABLE/DISABLE status for each of the one or more SCA mitigation elements included in the register circuit further comprises:
  receiving, by the control circuitry via an application programming interface (API) included in an operating system executable by the respective one of the plurality of processor threads, the one or more user-supplied input signals to selectively adjust the ENABLE/DISABLE status for each of the one or more SCA mitigation elements.

14. The SCA mitigation control method of claim 8 wherein associating the respective register circuit with the each of the plurality of processor threads further comprises:
    associating at least one model specific register (MSR) with the thread.

15. A side channel attack (SCA) mitigation system, comprising:
    for each of a plurality of processor threads initiated by one or more processor core circuits:
       means for associating a respective register circuit with each of the plurality of processor threads;
           wherein the register circuit includes information to selectively control ENABLE/DISABLE status for each of one or more SCA mitigation elements included in an SCA mitigation feature associated with the respective one of the plurality of processor threads; and
       means for selectively adjusting the ENABLE/DISABLE status for each of the one or more SCA mitigation elements included in the an SCA mitigation feature based on one or more control input signals.

16. The SCA mitigation control system of claim 15, further comprising:
    for each of at least some of the plurality of processor threads:
       means for receiving a thread status signal that includes information representative of at least one system status associated with the respective one of the plurality of processor threads; and
       means for autonomously generating the one or more control input signals to selectively adjust the ENABLE/DISABLE status of the one or more SCA mitigation elements associated with the respective one of the plurality of processor threads based on the received information representative of the at least one system status associated with the respective one of the plurality of processor threads.

17. The SCA mitigation control system of claim 15, further comprising:
    for each of at least some of the plurality of processor threads:
       means for autonomously setting the register circuit to a first default value upon receipt of a signal containing information indicative of a context switch of the respective one of the plurality of processor threads from a user-level operating mode to a kernel-level operating mode.

18. The SCA mitigation control system of claim 15, further comprising:
    for each of at least some of the plurality of processor threads:
       means for autonomously setting the register circuit to a second default value upon receipt of a signal containing information indicative of a context switch of the respective one of the plurality of processor threads associated with the register circuit from a kernel-level operating mode to a user-level operating mode.

19. The SCA mitigation control method of claim 15, further comprising:
    for each of at least some of the plurality of processor threads:
       means for receiving one or more user-supplied input signals to adjust the ENABLE/DISABLE status for each of the one or more SCA mitigation elements; and
       means for setting the register circuit to the user-supplied ENABLE/DISABLE status for each of the one or more SCA mitigation elements associated with the respective one of the plurality of processor threads.

20. The SCA mitigation control system of claim 19 wherein the means for receiving the one or more user-supplied input signals to adjust the ENABLE/DISABLE status for each of the one or more SCA mitigation elements included in the register circuit further comprises:
    means for receiving, via an application programming interface (API) included in an operating system executable by the respective one of the plurality of processor threads, the one or more user-supplied input signals to selectively adjust the ENABLE/DISABLE status for each of the one or more SCA mitigation elements.

21. The SCA mitigation control system of claim 15 wherein the means for associating the respective register circuit with each of the plurality of processor threads further comprises:
    means for associating at least one model specific register (MSR) with the respective one of the plurality of processor threads.

22. A non-transitory storage device that includes instructions that, when executed by side channel attack (SCA) mitigation control circuitry, cause the SCA mitigation control circuitry to:
    for each of a plurality of processor threads initiated by one or more processor core circuits:
       associate a respective register circuit with each of the plurality of processor threads;
           wherein the register circuit includes information to selectively adjust an ENABLE/DISABLE status for each of one or more SCA mitigation elements included in an SCA mitigation feature associated with the respective one of the plurality of processor threads; and
       selectively adjust the ENABLE/DISABLE status for each of the one or more SCA mitigation elements included in the an SCA mitigation feature based on one or more control input signals.

23. The non-transitory storage device of claim 22 wherein the instructions further cause the SCA mitigation control circuitry to:
    for each of at least some of the plurality of processor threads:
       receive a thread status signal that includes information representative of at least one system status associated with the respective one of the plurality of processor threads; and
       autonomously generate the one or more control input signals to selectively adjust the ENABLE/DISABLE status of the one or more SCA mitigation elements associated with the respective one of the plurality of processor threads based on the received information representative of the at least one system status associated with the respective one of the plurality of processor threads.

24. The non-transitory storage device of claim 22 wherein the instructions further cause the SCA mitigation control circuitry to:
    for each of at least some of the plurality of processor threads:
       autonomously set the register circuit to a first default value upon receipt of a signal containing information indicative of a context switch of the respective one of the plurality of processor threads from a user-level operating mode to a kernel-level operating mode.

25. The non-transitory storage device of claim 22 wherein the instructions further cause the SCA mitigation control circuitry to:
for each of at least some of the plurality of processor threads:
autonomously set the register circuit to a second default value upon receipt of a signal containing information indicative of a context switch of the respective one of the plurality of processor threads associated with the register circuit from a kernel-level operating mode to a user-level operating mode.

26. The non-transitory storage device of claim 22 wherein the instructions further cause the SCA mitigation control circuitry to:
for each of at least some of the plurality of processor threads:
receive one or more user-supplied input signals to selectively adjust the ENABLE/DISABLE status for each of the one or more SCA mitigation elements; and
selectively adjust the register circuit to the user-supplied ENABLE/DISABLE status for each of the one or more SCA mitigation elements associated with the respective one of the plurality of processor threads.

27. The non-transitory storage device of claim 26 wherein the instructions that cause the SCA mitigation control circuitry to receive the one or more user-supplied input signals to selectively adjust the ENABLE/DISABLE status for each of the one or more SCA mitigation elements included in the register circuit further cause the SCA mitigation control circuitry to:
receive, via an application programming interface (API) included in an operating system executable by the respective one of the plurality of processor threads, the one or more user-supplied input signals to selectively adjust the ENABLE/DISABLE status for each of the one or more SCA mitigation elements.

28. The non-transitory storage device of claim 22 wherein the instructions that cause the SCA mitigation control circuitry to associate the respective register circuit with each of the plurality of processor threads further cause the SCA mitigation control circuitry to:
associate at least one model specific register (MSR) with the respective one of the plurality of processor threads.

* * * * *